(12) United States Patent
Vorbach et al.

(10) Patent No.: US 7,174,443 B1
(45) Date of Patent: Feb. 6, 2007

(54) RUN-TIME RECONFIGURATION METHOD FOR PROGRAMMABLE UNITS

(75) Inventors: Martin Vorbach, Karlsruhe (DE); Robert Münch, Karlsruhe (DE)

(73) Assignee: Pact XPP Technologies AG, Munich (DE)

( * ) Notice: Subject to any disclaimer, the term of this patent is extended or adjusted under 35 U.S.C. 154(b) by 0 days.

(21) Appl. No.: 09/494,567

(22) Filed: Jan. 31, 2000

Related U.S. Application Data

(63) Continuation of application No. 08/946,998, filed on Oct. 8, 1997, now Pat. No. 6,021,490.

(30) Foreign Application Priority Data

Oct. 8, 1997 (DE) ................................ 196 54 593

(51) Int. Cl.
G06F 15/16 (2006.01)
G06F 15/80 (2006.01)

(52) U.S. Cl. ................ 712/229; 712/15; 712/43

(58) Field of Classification Search .......... 712/226, 712/229, 34, 35, 36, 43, 10–22; 717/171, 717/172, 173

See application file for complete search history.

(56) References Cited

U.S. PATENT DOCUMENTS

| | | | |
|---|---|---|---|
| 2,067,477 A | 1/1937 | Cooper | |
| 3,242,998 A | 3/1966 | Gubbins | |
| 3,681,578 A | 8/1972 | Stevens | |
| 3,757,608 A | 9/1973 | Willner | |
| 3,855,577 A | 12/1974 | Vandierendonck | |
| 4,498,172 A | 2/1985 | Bhavsar | |
| 4,566,102 A | 1/1986 | Hefner | |
| 4,663,706 A | 5/1987 | James et al. | |
| 4,682,284 A * | 7/1987 | Schrofer | 710/55 |
| 4,706,216 A | 11/1987 | Carter | |
| 4,720,780 A | 1/1988 | Dolecek | |

(Continued)

FOREIGN PATENT DOCUMENTS

DE 42 21 278 1/1994

(Continued)

OTHER PUBLICATIONS

Villasenor, John, et al., "Configurable Computing." *Scientific American*, vol. 276, No. 6, Jun. 1997, pp. 66-71.

(Continued)

*Primary Examiner*—Kim Huynh
*Assistant Examiner*—Tonia L. Meonske
(74) *Attorney, Agent, or Firm*—Kenyon & Kenyon LLP

(57) ABSTRACT

A method of run-time reconfiguration of a programmable unit is provided, the programmable unit including a plurality of reconfigurable function cells in a multidimensional arrangement. An event is detected. The source of the detected event is determined, and an address of an entry in a jump table is calculated as a function of the source of the event, the entry storing a memory address of a configuration for a reconfigurable function cell. The entry is retrieved and a state of a corresponding reconfigurable cell is determined. If the reconfigurable cell is in a reconfiguration state, the reconfigurable cell is reconfigured as a function of the configuration data. If the reconfigurable cell in not in reconfiguration state, the configuration data is stored in a FIFO.

24 Claims, 6 Drawing Sheets

U.S. PATENT DOCUMENTS

| | | |
|---|---|---|
| 4,739,474 A | 4/1988 | Holsztynski |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,891,810 A | 1/1990 | de Corlieu et al. |
| 4,901,268 A | 2/1990 | Judd |
| 4,910,665 A | 3/1990 | Mattheyses et al. |
| 4,967,340 A | 10/1990 | Dawes |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,047,924 A | 9/1991 | Matsubara et al. |
| 5,065,308 A | 11/1991 | Evans |
| 5,072,178 A | 12/1991 | Matsumoto |
| 5,081,375 A | 1/1992 | Pickett et al. |
| 5,109,503 A | 4/1992 | Cruickshank et al. |
| 5,113,498 A | 5/1992 | Evan et al. |
| 5,123,109 A | 6/1992 | Hillis |
| 5,125,801 A | 6/1992 | Nabity et al. |
| 5,144,166 A | 9/1992 | Camarota et al. |
| 5,193,202 A | 3/1993 | Lee et al. |
| 5,203,005 A | 4/1993 | Horst |
| 5,204,935 A | 4/1993 | Mihara et al. |
| 5,208,491 A | 5/1993 | Ebeling et al. |
| 5,226,122 A | 7/1993 | Thayer et al. |
| RE34,363 E | 8/1993 | Freeman |
| 5,233,539 A | 8/1993 | Agrawal et al. |
| 5,247,689 A | 9/1993 | Ewert |
| 5,274,593 A | 12/1993 | Proebsting |
| 5,287,472 A | 2/1994 | Horst |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,336,950 A | 8/1994 | Popli et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,410,723 A | 4/1995 | Schmidt et al. |
| 5,418,952 A | 5/1995 | Morley et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemney et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,600,265 A | 2/1997 | El Gamal et al. |
| 5,611,049 A | 3/1997 | Pitts |
| 5,625,806 A | 4/1997 | Kromer |
| 5,649,176 A | 7/1997 | Selvidge et al. |
| 5,649,179 A | 7/1997 | Steenstra et al. |
| 5,655,069 A | 8/1997 | Ogawara et al. |
| 5,657,330 A | 8/1997 | Matsumoto |
| 5,659,797 A | 8/1997 | Zandveld et al. |
| 5,675,743 A | 10/1997 | Mavity |
| 5,680,583 A | 10/1997 | Kuijsten |
| 5,717,943 A | 2/1998 | Barker et al. |
| 5,732,209 A | 3/1998 | Vigil et al. |
| 5,734,921 A | 3/1998 | Dapp et al. |
| 5,748,872 A | 5/1998 | Norman |
| 5,754,827 A | 5/1998 | Barbier et al. |
| 5,760,602 A | 6/1998 | Tan |
| 5,773,994 A | 6/1998 | Jones |
| 5,784,636 A | 7/1998 | Rupp |
| 5,794,059 A | 8/1998 | Barker et al. |
| 5,794,062 A | 8/1998 | Baxter |
| 5,801,715 A | 9/1998 | Norman |
| 5,802,290 A * | 9/1998 | Casselman .................. 709/201 |
| 5,828,229 A | 10/1998 | Cliff et al. |
| 5,844,888 A | 12/1998 | Markkula, Jr. et al. |
| 5,848,238 A | 12/1998 | Shimomura et al. |
| 5,854,918 A | 12/1998 | Baxter |
| 5,859,544 A | 1/1999 | Norman |
| 5,865,239 A | 2/1999 | Carr |
| 5,867,723 A | 2/1999 | Peters et al. |
| 5,884,075 A | 3/1999 | Hester et al. |
| 5,887,162 A | 3/1999 | Williams et al. |
| 5,889,982 A * | 3/1999 | Rodgers et al. .............. 712/229 |
| 5,892,370 A | 4/1999 | Eaton et al. |
| 5,901,279 A | 5/1999 | Davis, III |
| 5,924,119 A | 7/1999 | Sindhu et al. |
| 5,933,642 A | 8/1999 | Baxter et al. |
| 5,966,534 A | 10/1999 | Cooke et al. |
| 5,970,254 A * | 10/1999 | Cooke et al. .................. 712/37 |
| 6,011,407 A | 1/2000 | New |
| 6,021,490 A | 2/2000 | Vorbach et al. |
| 6,023,564 A | 2/2000 | Trimberger |
| 6,023,742 A | 2/2000 | Ebeling et al. |
| 6,034,538 A | 3/2000 | Abramovici |
| 6,038,650 A | 3/2000 | Vorbach et al. |
| 6,038,656 A | 3/2000 | Cummings et al. |
| 6,047,115 A | 4/2000 | Mohan et al. |
| 6,049,222 A | 4/2000 | Lawman |
| 6,058,469 A | 5/2000 | Baxter |
| 6,081,903 A | 6/2000 | Vorbach et al. |

| | | | | | |
|---|---|---|---|---|---|
| 6,085,317 A | 7/2000 | Smith | DE | 196 54 593 | 7/1998 |
| 6,086,628 A | 7/2000 | Dave et al. | DE | 197 04 044 | 8/1998 |
| 6,088,795 A | 7/2000 | Vorbach et al. | DE | 197 04 742 | 9/1998 |
| 6,092,174 A | 7/2000 | Roussakov | DE | 198 07 872 | 8/1999 |
| 6,105,105 A | 8/2000 | Trimberger et al. | DE | 198 61 088 | 2/2000 |
| 6,108,760 A | 8/2000 | Mirsky et al. | DE | 199 26 538 | 12/2000 |
| 6,119,181 A | 9/2000 | Vorbach et al. | DE | 100 28 397 | 12/2001 |
| 6,122,719 A | 9/2000 | Mirsky et al. | DE | 100 36 627 | 2/2002 |
| 6,125,408 A | 9/2000 | McGee et al. | DE | 101 29 237 | 4/2002 |
| 6,172,520 B1 | 1/2001 | Lawman et al. | DE | 102 04 044 | 8/2003 |
| 6,173,434 B1 | 1/2001 | Wirthlin et al. | EP | 0 208 457 | 1/1987 |
| 6,202,182 B1 | 3/2001 | Abramovici et al. | EP | 0 221 360 | 5/1987 |
| 6,219,833 B1 | 4/2001 | Solomon et al. | EP | 0428327 A1 | 5/1991 |
| 6,230,307 B1 | 5/2001 | Davis et al. | EP | 0 477 809 | 4/1992 |
| 6,243,808 B1 | 6/2001 | Wang | EP | 0 485 690 | 5/1992 |
| 6,260,179 B1 | 7/2001 | Ohsawa et al. | EP | 0 497 029 | 8/1992 |
| 6,263,430 B1 | 7/2001 | Trimberger et al. | EP | 0539595 A1 | 5/1993 |
| 6,279,077 B1 | 8/2001 | Nasserbakht et al. | EP | 0 628 917 | 12/1994 |
| 6,282,627 B1 | 8/2001 | Wong et al. | EP | 0 678 985 | 10/1995 |
| 6,288,566 B1 | 9/2001 | Hanrahan et al. | EP | 0 686 915 | 12/1995 |
| 6,289,440 B1 | 9/2001 | Casselman | EP | 0707269 A | 4/1996 |
| 6,298,472 B1 | 10/2001 | Phillips et al. | EP | 0 726 532 | 8/1996 |
| 6,311,200 B1 | 10/2001 | Hanrahan et al. | EP | 0726532 | 8/1996 |
| 6,321,366 B1 | 11/2001 | Tseng et al. | EP | 0 735 685 | 10/1996 |
| 6,321,373 B1 | 11/2001 | Ekanadham et al. | EP | 735 685 | 10/1996 |
| 6,338,106 B1 | 1/2002 | Vorbach et al. | EP | 0748051 A2 | 12/1996 |
| 6,341,318 B1 | 1/2002 | Dakhil | EP | 0735685 | 10/1998 |
| 6,347,346 B1 | 2/2002 | Taylor | EP | 0 926 594 | 6/1999 |
| 6,349,346 B1 | 2/2002 | Hanrahan et al. | EP | 1 146 432 | 10/2001 |
| 6,370,596 B1 | 4/2002 | Dakhil | WO | A9004835 | 5/1990 |
| 6,378,068 B1 | 4/2002 | Foster et al. | WO | WO90/11648 | 10/1990 |
| 6,389,379 B1 | 5/2002 | Lin et al. | WO | A9311503 | 6/1993 |
| 6,389,579 B1 | 5/2002 | Phillips et al. | WO | 94/08399 | 4/1994 |
| 6,392,912 B1 | 5/2002 | Hanrahan et al. | WO | 95/00161 | 1/1995 |
| 6,405,299 B1 | 6/2002 | Vorbach et al. | WO | 95/26001 | 9/1995 |
| 6,421,817 B1 | 7/2002 | Mohan et al. | WO | WO98/26356 | 6/1998 |
| 6,425,068 B1 | 7/2002 | Vorbach et al. | WO | WO98/28697 | 7/1998 |
| 6,457,116 B1 | 9/2002 | Mirsky et al. | WO | WO98/29952 | 7/1998 |
| 6,477,643 B1 | 11/2002 | Vorbach et al. | WO | WO98/31102 | 7/1998 |
| 6,480,937 B1 | 11/2002 | Vorbach et al. | WO | WO98/35299 | 8/1998 |
| 6,480,954 B2 | 11/2002 | Trimberger et al. | WO | WO99/00731 | 1/1999 |
| 6,513,077 B2 | 1/2003 | Vorbach et al. | WO | WO99/00739 | 1/1999 |
| 6,519,674 B1 | 2/2003 | Lam et al. | WO | WO99/32975 | 7/1999 |
| 6,526,520 B1 | 2/2003 | Vorbach et al. | WO | WO99/40522 | 8/1999 |
| 6,538,468 B1 | 3/2003 | Moore | WO | WO99/44120 | 9/1999 |
| 6,539,477 B1 | 3/2003 | Seawright | WO | WO99/44147 | 9/1999 |
| 6,542,998 B1 | 4/2003 | Vorbach et al. | WO | WO00/17771 | 3/2000 |
| 6,571,381 B1 | 5/2003 | Vorbach et al. | WO | WO00/38087 | 6/2000 |
| 6,587,939 B1 | 7/2003 | Takano | WO | WO00/77652 | 12/2000 |
| 6,657,457 B1 | 12/2003 | Hanrahan et al. | WO | WO02/13000 | 2/2002 |
| 6,687,788 B2 | 2/2004 | Vorbach et al. | WO | WO02/21010 | 3/2002 |
| 6,697,979 B1 | 2/2004 | Vorbach et al. | WO | WO02/29600 | 4/2002 |
| 2002/0038414 A1 | 3/2002 | Taylor et al. | WO | WO02/71248 | 9/2002 |
| 2002/0143505 A1 | 10/2002 | Drusinsky | WO | WO02/71249 | 9/2002 |
| 2002/0144229 A1 | 10/2002 | Hanrahan | WO | WO02/103532 | 12/2002 |
| 2002/0165886 A1 | 11/2002 | Lam | WO | WO03/17095 | 2/2003 |
| 2003/0014743 A1 | 1/2003 | Cooke et al. | WO | WO03/23616 | 3/2003 |
| 2003/0046607 A1 | 3/2003 | Vorbach | WO | WO03/25781 | 3/2003 |
| 2003/0052711 A1 | 3/2003 | Taylor et al. | WO | WO03/32975 | 4/2003 |
| 2003/0055861 A1 | 3/2003 | Lai et al. | WO | WO03/36507 | 5/2003 |
| 2003/0056085 A1 | 3/2003 | Vorbach | | | |
| 2003/0056091 A1 | 3/2003 | Greenberg | | | |
| 2003/0056202 A1 | 3/2003 | Vorbach | | | |
| 2003/0093662 A1 | 5/2003 | Vorbach et al. | | | |
| 2003/0097513 A1 | 5/2003 | Vorbach et al. | | | |
| 2003/0123579 A1 | 7/2003 | Safavi et al. | | | |
| 2003/0135686 A1 | 7/2003 | Vorbach et al. | | | |
| 2004/0015899 A1 | 1/2004 | May et al. | | | |
| 2004/0025005 A1 | 2/2004 | Vorbach et al. | | | |

FOREIGN PATENT DOCUMENTS

| | | |
|---|---|---|
| DE | 38 55 673 | 11/1996 |

OTHER PUBLICATIONS

Villasenor, John, et al., "Configurable Computing Solutions for Automatic Target Recognition," *IEEE*, 1996 pp. 70-79.

Athanas, Peter, et al., "IEEE Symposium on FPGAs For Custom Computing Machines," *IEEE Computer Society Press*, Apr. 19-21, 1995, pp. i-vii, 1-222.

M. Saleeba, "A Self-Contained Dynamically Reconfigurable Processor Architecture", Sixteenth Australian Computer Science Conference, ASCS-16, QLD, Australia, Feb., 1993.

M. Morris Mano, "Digital Design," by Prentice Hall, Inc., Englewood Cliffs, New Jersey 07632, 1984, pp. 119-125, 154-161.

Maxfield, C. "Logic that Mutates While-U-Wait" EDN (Bur. Ed) (USA), EDN (European Edition), Nov. 7, 1996, Cahners Publishing, USA.

Norman, Richard S., Hyperchip Business Summary, The Opportunity, Jan. 31, 2000, pp. 1-3.

Arabi et al., "PLD Integrates Dedicated High-speed Data Buffering, Complex State Machine, and Fast Decode Array," conference record on WESCON '93, Sep. 28, 1993, pp. 432-436.

Ade et al., "Minimum Memory Buffers in DSP Applications," Electronics Letters, vol. 30, No. 6, Mar. 17, 1994, pp. 469-471.

Villasenor, John et al., "Configurable Computing," Scientific American, vol. 276, No. 6, Jun. 1997, pp. 66-71.

Villasenor, John et al., "Configurable Computing Solutions for Automatic Target Recognition," IEEE, 1996 pp. 70-79.

Tau, Edward et al., "A First Generation DPGA Implementation," FPD'95, pp. 138-143.

Shirazi et al., "Quantitative analysis of floating point arithmetic on FPGA based custom computing machines," IEEE Symposium on FPGAs For Custom Computing Machines, IEEE Computer Society Press, Apr. 19-21, 1995, pp. i-vii, 1-222.

Athanas, Peter et al., "An Adaptive Hardware Machine Architecture and Compiler and Dynamic Processor Reconfiguration", IEEE, Laboratory for Engineering Man/Machine Systems Division of Engineering, Box D, Brown University Providence, Rhode Island, 1991, pp. 397-400.

Bittner, Ray A. Jr., "Wormhole Run-time Reconfiguration: Conceptualization and VLSI Design of a High Performance Computing System," Dissertation, Jan. 23, 1997, pp. I-XX, 1-415.

Norman, Richard S., "Hyperchip Business Summary, The Opportunity," Jan. 31, 2000, pp. 1-3.

Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Hwang L. et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Nilsson et al., "The Scalable Tree Protocol - A Cache Coherence Approaches for Large-Scale Multiprocessors" IEEE, pp. 498-506 Dec. 1992.

Wu et al., "A New Cache Directory Scheme", IEEE, pp. 466-472, Jun. 1996.

Hauck "The Roles of FPGA's in Reprogrammable Systems," IEEE, Apr. 1998, pp. 615-638.

Wittig et al., "OneChip: An FPGA Processor with Reconfigurable Logic" IEEE, 1996 pp. 126-135.

Cadambi et al., "Managing Pipeline-reconfigurable FPGAs," ACM, 1998, pp. 55-64.

Hong Yu Xu et al., "Parallel QR Factorization on a Block Data Flow Architecture" Conference Proceeding Article, Mar. 1, 1992, pp. 332-336 XPO10255276, p. 333, Abstract 2.2, 2.3, 2.4 - p. 334.

Kung, "Deadlock Avoidance for Systolic Communication", 1988 Conference Proceedings of 15th Annual International Symposium on Computer Architecture, May 30, 1988, pp. 252-260.

TMS320C54X DSP: CPU and Peripherals, Texas Instruments, 1996, pp. 6-26 to 6-46.

TMS320C54x DSP: Mnemonic Instruction Set, Texas Instruments, 1996, pp. 4-64.

Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.

Donandt, Jorg, "Improving Response Time of Programmable Logic Controllers by Use of a Boolean Coprocessors", AEG Research Institute Berlin, IEEE, 1989, pp. 4-167 - 4-169.

Tenca, Alexandre F. et al., "A Variable Long-Precision Arithmetic Unit Design for Reconfigurable Coprocessor Architectures", University of California, Los Angeles, 1998, pp. 216-225.

Koch, Andreas et al, "Practical Experiences with the SPARXIL Co-Processor", 1998, IEEE, pp. 394-398.

Gokhale, M. B. et al., "Automatic Allocation of Arrays to Memories in FPGA processors with Multiple Memory Banks", Field-Programmable Custom Computing Machines, 1999, IEEE, pp. 63-67.

Diniz, Pedro et al., "Automatic Synthesis of Data Storage and Control Structures for FPGA-based Computing Engines", 2000, IEEE, pp. 91-100.

John, Lizy et al., "A Dynamically Reconfigurable Interconnect for Array Processors", vol. 6, No. 1, Mar. 1998, IEEE, pp. 150-157.

Fineberg, Samuel et al., "Experimental Analysis of a Mixed-Mode Parallel Architecture Using Bitonic Sequence Sorting", vol. 11. No. 3, Mar. 1991, pp. 239-251.

Jacob, Jeffrey et al., "Memory Interfacing and Instruction Specification for Reconfigurable Processors", ACM 1999, pp. 145-154.

Ye, Z.A. et al., "A Compiler for a Processor With A Reconfigurable Functional Unit," FPGA 2000 ACM/SIGNA International Symposium on Field Programmable Gate Arrays, Monterey, CA Feb. 9-11, 2000, pp. 95-100.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Villasensor, J. et al., "Express Letters Video Communications Using Rapidly Reconfigurable Hardware," IEEE Transactions on Circuits and Systems for Video Technology, IEEE, Inc. NY, Dec. 1995, pp. 565-567.

Hedge, S.J., 3D WASP Devices for On-line Signal and Data Processing, 1994, International Conference on Wafer Scale Integration, pp. 11-21.

Alippi, C., et al., Determining the Optimum Extended Instruction Set Architecture for Application Specific Reconfigurable VLIW CPUs, IEEE., 2001, pp. 50-56.

Dutt, Nikil et al., If Software is King for Systems-on-Silicon, What's New in Compiler?, IEEE., 1997, pp. 322-325.

Zhang, N. Et al., Architectural Evaluation of Flexible Digital Signal Processing for Wireless Receivers, Signals, Systems and Computers, 2000; Conference Record of the Thirty-Fourth Asilomar Conference, Bd.1, Oct. 29, 2000, pp. 78-83.

Fornaciari, W. Et al., System-level power evaluation metrics, 1997 Proceedings of the 2nd Annual IEEE International Conference on Innovative Systems in Silicon, New York, NY, Oct. 1997, pp. 323-330.

Schmit, H. Et al., Hidden Markov Modeling and Fuzzy Controllers in FPGAs, FPGAs for Custom Computing Machined, 1995; Proceedings, IEEE Symposium on Napa Valley, CA, Apr. 1995, pp. 214-221.

Simunic, T. Et al., Source Code Optimization and Profiling of Energy Consumption in Embedded Systems, Proceedings of the 13th International Symposium on System Synthesis, Sep. 2000, pp. 193-198.

Myers, G. "Advances in Computer Architecture," Wiley-Interscience Publication, 2nd ed., John Wiley & Sons, Inc., 1978, pp. 463-494.

M. Saleeba, "A Self-Contained Dynamically Reconfigurable Processor Architecture," Sixteenth Australian Computer Science Conference, ASCS-16, QLD, Australia, Feb., 1993, pp. 59-70.

Maxfield, C. "Logic that Mutates While-U-Wait" EDN (Bur. Ed) (USA), EDN (European Edition), Nov. 7, 1996, Cahners Publishing, USA, pp. 137-140, 142.

Baumgarte, V., et al., PACT XPP "A Self-reconfigurable Data Processing Architecture," PACT Info. GmbH, Munchen Germany, 2001, 7 pages.

Jantsch, Axel et al., "A Case Study on Hardware/software Partitioning," Royal Institute of Technology, Kista, Sweden, Apr. 10, 1994 IEEE, pp. 111-118.

Becker, J. et al., "Parallelization in Co-compilation for Configurable Accelerators - a Host/accelerator Partitioning Compilation Method," proceedings of Asia and South Pacific Design Automation Conference, Yokohama, Japan, Feb. 10-13, 1998, 11 pages.

Isshiki, Tsuyoshi et al., "Bit-Serial Pipeline Synthesis for Multi-FPGA Systems with C++ Design Capture," 1996 IEEE, pp. 38-47.

Weinhardt, Markus, "Ubersetzingsmethoden fur strukturprogrammierbare rechner," Dissertation for Doktors der Ingenieurwissenschaften der Universitat Karlsruhe: Jul. 1, 1997 [Weinhardt, M.

"Compilation Methods for Structure-programmable Computers", dissertation, ISBN 3-89722-011-3,1997], 154 pages.

Weinhardt, Markus et al., "Pipeline Vectorization," IEEE Transactions on Computer-Aided Design of Integrated Circuits and Systems, vol. 20, No. 2, Feb. 2001, pp. 234-248.

Weinhardt, Markus et al., "Pipeline Vectorization for Reconfigurable Systems", 1999, IEEE, pp. 52-62.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Wada et al., "A Performance Evaluation of Tree-based Coherent Distributed Shared Memory" Proceedings of the Pacific RIM Conference on Communications, Comput and Signal Processing, Victoria, May 19-21 1993, pp. 390-393.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and *English Abstract only*).

Hauser, J.R. et al., "Garp: A MIPS Processor with a Reconfigurable Coprocessor", University of California, Berkeley, IEEE, 1997, pp. 24-33.

Iseli, C., et al., "A C++ Compiler for FPGA Custom Execution Units Synthesis," IEEE. 1995, pp. 173-179.

\* cited by examiner

Configuration Program

1st Command Address=0x12161

```
1,1 ADD
1,2 MUL
1,3 MUL
1,1 CONNECT 1,2 A
1,2 CONNECT 1,3 A
. . .
DISPATCH 41,0x34454
END
```

Jump Table

| Entry 39: | 0x12354 |
| Entry 40: | 0x30078 |
| Entry 41: | 0x12161 |

| Entry 39: | 0x12354 |
| Entry 40: | 0x30078 |
| Entry 41: | 0x34454 |

1st Command Address=0x34454

```
1,1 DIV
1,2 NOT
2,3 ADD
1,1 CONNECT 1,2 A
1,2 CONNECT 2,3 A
1,1 CONNECT 2,3 B
. . .
DISPATCH 12,0x45478
END
```

| Entry 11: | 0x12387 |
| Entry 12: | 0x08178 |
| Entry 13: | 0x82161 |

| Entry 11: | 0x12387 |
| Entry 12: | 0x30178 |
| Entry 13: | 0x82161 |

RUN-TIME RECONFIGURATION METHOD FOR PROGRAMMABLE UNITS

This application is a continuation of application 08/946,998 filed Oct. 8, 1997, now U.S. Pat. No. 6,021,490.

FIELD OF THE INVENTION

The present invention relates to reprogrammable units.

BACKGROUND INFORMATION

Programmable units with a two- or multi-dimensional cell architecture (in particular FPGAs, DPGAs and DFPs, etc.) are programmed today in two different ways.
 Once, i.e., the configuration cannot be changed after programming. All the configured elements of the unit thus perform the same function over the entire period of time during which the application is being carried out.
 During operation, i.e., the configuration can be changed after installation of the unit, by loading a configuration data file, at the start of the application. Units such as, for example, FPGA units, cannot be reconfigured during operation. With reconfigurable units, further processing of data during the reconfiguration is usually impossible, and the required reconfiguration time is much too long.

In addition to FPGAs, there are also DPGAs. These units store a number of different configurations which are selected by a special data packet. Run-time reconfiguration of these memory devices is impossible.

Major problems are posed by run-time reconfiguration of all programmable units or parts thereof, especially synchronization. All the possibilities proposed so far involve stopping the processing of the entire unit during reconfiguration. Another problem is selection of the new subconfiguration to be loaded and integration of this subconfiguration into the existing configuration.

SUMMARY OF THE INVENTION

The method according to the present invention makes it possible to reload a run-time reconfigurable unit efficiently and without having any effect on the areas not involved in the reconfiguration. In addition, this method makes it possible to select configurations as a function of the prevailing configuration. The problem of synchronizing the areas involved in the reconfiguration with those not involved in the reconfiguration is also solved.

In accordance with an exemplary embodiment of the present invention, a method is provided for reconfiguring programmable units having a two- or multi-dimensional cell arrangement. The method of the present invention makes it possible to reconfigure the unit(s) without limiting the operability of the cells not involved in the reconfiguration. This method makes it possible to load complete configurations or subconfigurations into the programmable unit(s).

BRIEF DESCRIPTION OF THE DRAWINGS

FIG. 6 shows two details from a configuration program and four details from the jump table and how they are related in time in accordance with the exemplary embodiment of the present invention.

DETAILED DESCRIPTION OF THE INVENTION

Figure 2:
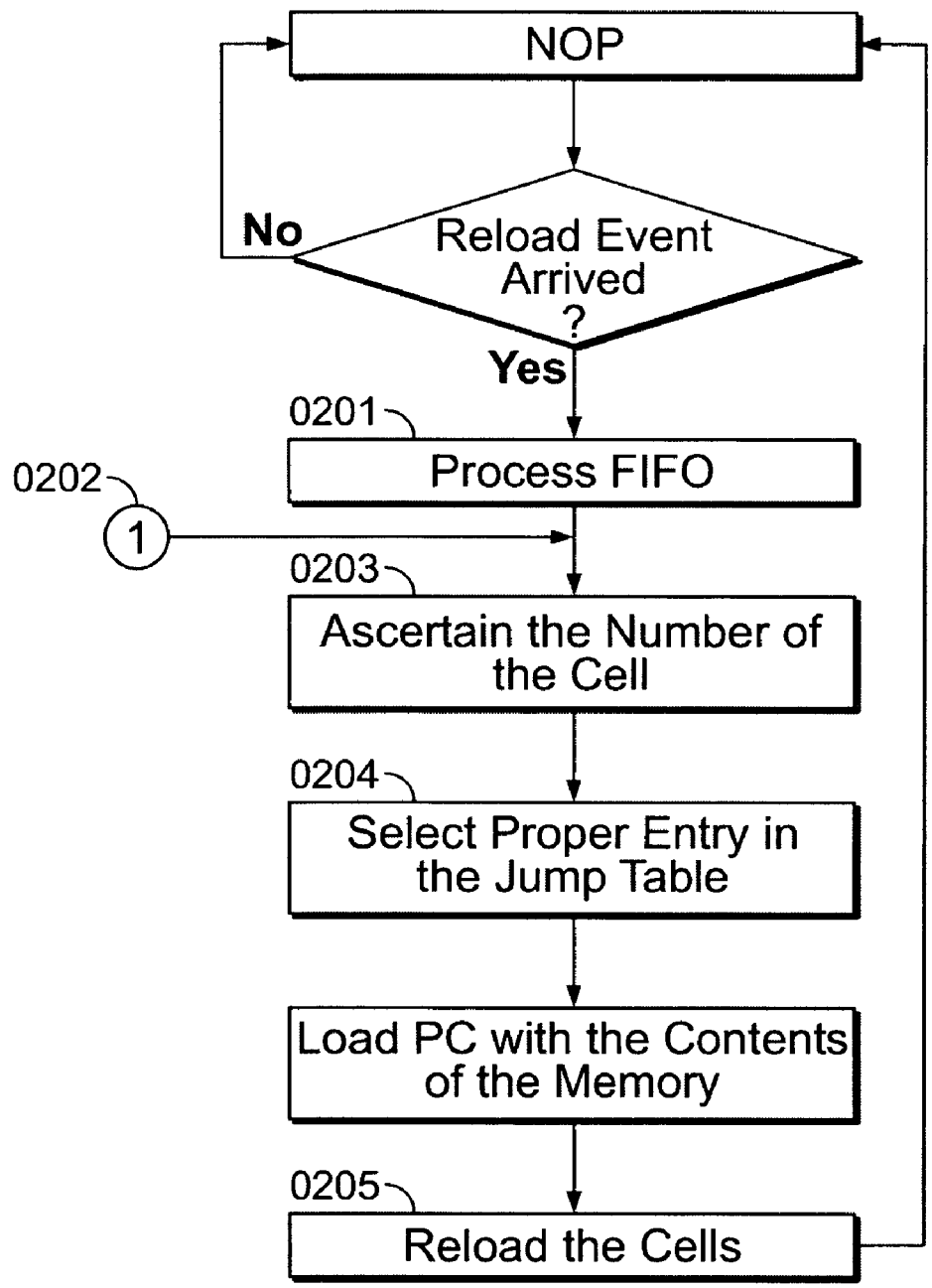
FIG. 2 shows a flow chart of the steps to be carried out after a reconfiguration request is received in accordance with the exemplary embodiment of the present invention.

The method in accordance with the exemplary embodiment that is described herein presupposes a programmable unit which has the following properties:
 Primary logic unit: The primary logic unit (PLU) is the part of the unit that performs the loading and entering of configuration strings into the elements of the unit to be configured (cells).
 Cells: The unit has a number of cells that can be addressed individually by the PLU.
 Feedback to the PLU: Each cell or group of cells must be able to notify the PLU whether it can be reconfigured.
 Feedback to cells: Each cell must have the option of sending a STOP signal to the cells from which it has received its data to be processed.
 START/STOP identifier: Each cell must have the possibility of setting a START/STOP identifier.
  The START identifier characterizes a cell as the start of a longer processing chain (macro).
  The STOP identifier marks the end of the macro, i.e., the point at which the processing of the macro has yielded a result.
 Structure of a configuration string: The PLU in accordance with the exemplary embodiment of the present invention is a state machine that can process configuration strings.
 In addition to configuration strings for cells, there are entries which can be recognized as commands by the PLU. It is thus possible to differentiate whether the contents of the configuration string are to be transmitted to a cell or whether they represent a command for the state machine.
 A configuration string which is transmitted to cells of the unit must contain at least the following data:
  Address of the cell, e.g., as linear numbers or as X, Y coordinates.
  Configuration string which is transmitted to the cell.
  Identifiers and commands for the PLU: For correct operation of the PLU, it must be able to recognize only two command strings, namely:
  END
   This is a command that sets the PLU in a state in which it waits for the arrival of events from cells (FIG. 2).
  DISPATCH (entry number, address)
   The PLU enters the value of the address parameter into the address, which is given by the entry number parameter, of the jump table.
 In addition, the PLU can recognize an entry as a blank entry. This is accomplished by defining a certain bit pattern as a blank identifier which can be recognized by the PLU.

Figure 5:
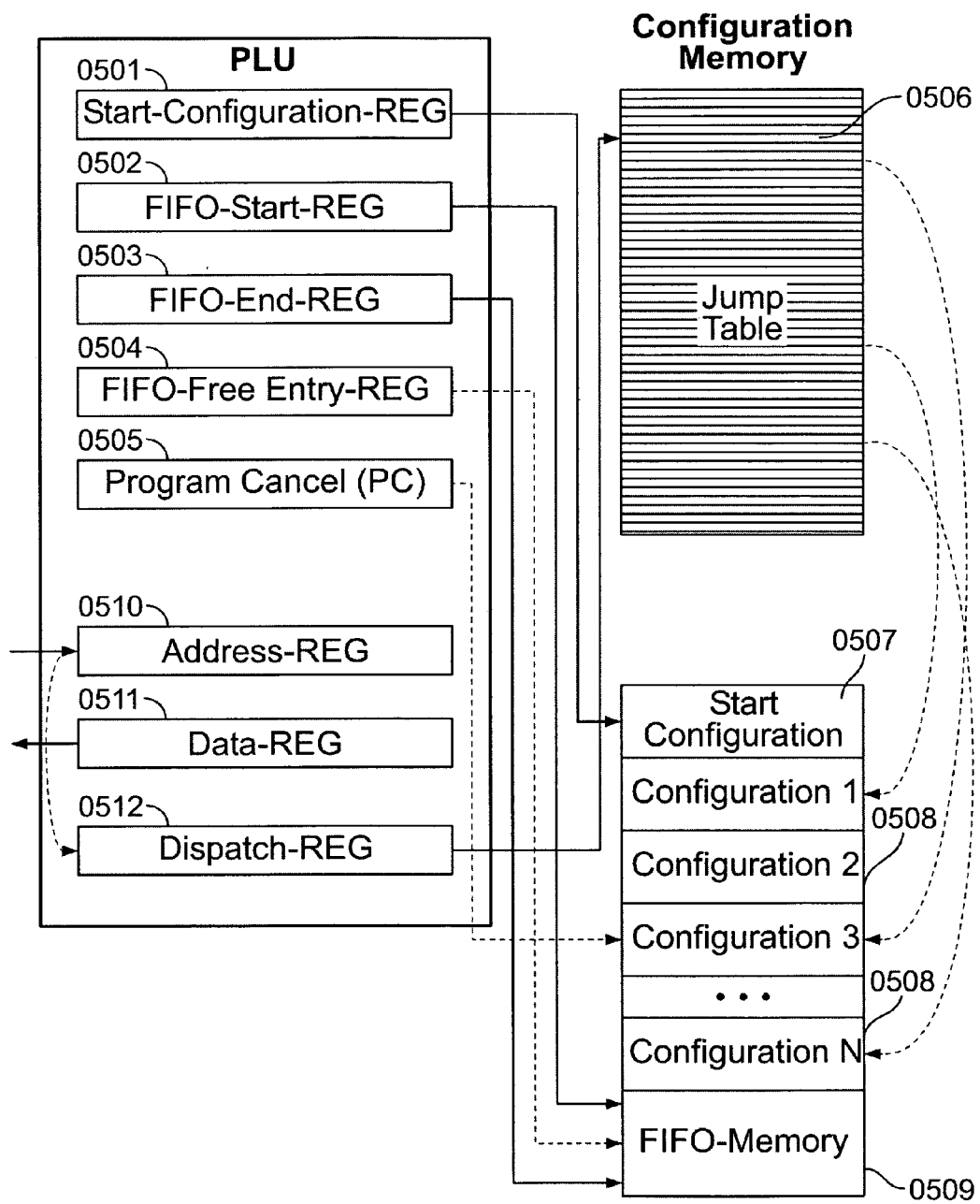
FIG. 5 shows the PLU with its registers, as well as the configuration memory, the subdivision into jump table, start configuration, additional configurations and the FIFO memories, in accordance with the exemplary embodiment of the present invention.

The jump table: There is a jump table (0506) in the configuration memory. The size of the jump table is selected, for example, so that there is exactly one single entry for each cell that can be addressed by the PLU. For each cell address there is exactly one single entry in the jump table which can be calculated by the PLU (FIGS. 5 and 6).

There is a memory address (0601) in an entry in the jump table. This memory address indicates where additional configuration data (0508) from the configuration memory are to be read if there is a feedback from this cell to the PLU.

Start of the system: By resetting the system, the PLU begins to receive or load configuration data from a memory into the configuration memory (0101). All the cells of the unit are in the state in which they can be configured. Then, by loading the program counter (PC) (0505), the PLU jumps to a memory site containing (0102) the address of a start configuration (0507). This start configuration is processed until the PLU recognizes an END identifier (0103). This start configuration programs the unit in such a way that processing of data can begin. After entering the start configuration, the PLU changes on the basis of the END identifier to a state in which it waits for results from the cells (0104).

Arrival of an event from a cell: After processing data, a cell can send a feedback to the PLU. This feedback (event) indicates that the cell and thus the macro in which the cell is contained has completed its work and reloading can begin.

However, before beginning with the loading of a new configuration, the FIFO memory (first-in-first-out memory) described below is processed (0201).

It is advantageous for the memory to be organized as a FIFO memory. This organization guarantees, for example, that cells which could not be reloaded in the first attempt are guaranteed to be the first in line in the second attempt. This prevents cells which have signaled in the meantime that they can be reconfigured from slipping to the back in processing. In this case, a deadlock situation could occur in which one macro can be reconfigured only when another macro has been reconfigured.

Through the feedback to the PLU, the PLU also receives the address or the number of the cell that triggered the feedback. With this number, the proper entry in the jump table is selected (0203, 0204). The address contained in this entry indicates the start of the configuration to be loaded within the configuration memory (0205).

FIFO memory: The method in accordance with the exemplary embodiment of the present invention takes into account the fact that some cells might not have completed their work, although these cells should already be reloaded. All configuration data of cells in which such a condition applies are copied to a special memory area (FIFO memory) (0506).

Each time before a new configuration is to be loaded, the FIFO memory is run through. Since a new configuration is to be loaded, some cells have completed their work and have entered the "reconfigurable" state. These cells may also include those in which reconfiguration by the PLU has failed in a previous attempt because these cells had not yet completed their work but now this reconfiguration can be performed successfully.

This PLU loads the PC with the contents of the register which indicates the start of FIFO memory (FIFO start REG) (0502) and reads data out of the FIFO memory. A comparison ascertains whether the end of the FIFO memory has been reached (0301). If this is the case, the system returns to the point in the state machine where reconfiguration is continued (0202).

The FIFO memory is processed like a configuration within the configuration memory. The case can occur where a cell cannot be reconfigured even with another attempt. In this case the configuration data is copied (0302) to this memory location if there is an empty memory location closer to the front of FIFO memory.

This copying operation is accomplished by virtue of the fact that the PLU has stored the start address of the FIFO memory in FIFO start REG (0502) and the end address in FIFO end REG (0503). In addition, the PLU identifies the address of the next free entry (starting from the beginning of the FIFO memory) by means of FIFO free entry REG (0504, 0303). After the configuration string has been copied (0304) to the free entry, the PLU positions the pointer of FIFO free entry REG at the next free entry (0305) within the FIFO memory. The search is then conducted in the direction of the end of the FIFO memory. Then the PC is set at the next entry within the FIFO memory (0306).

Figure 4:
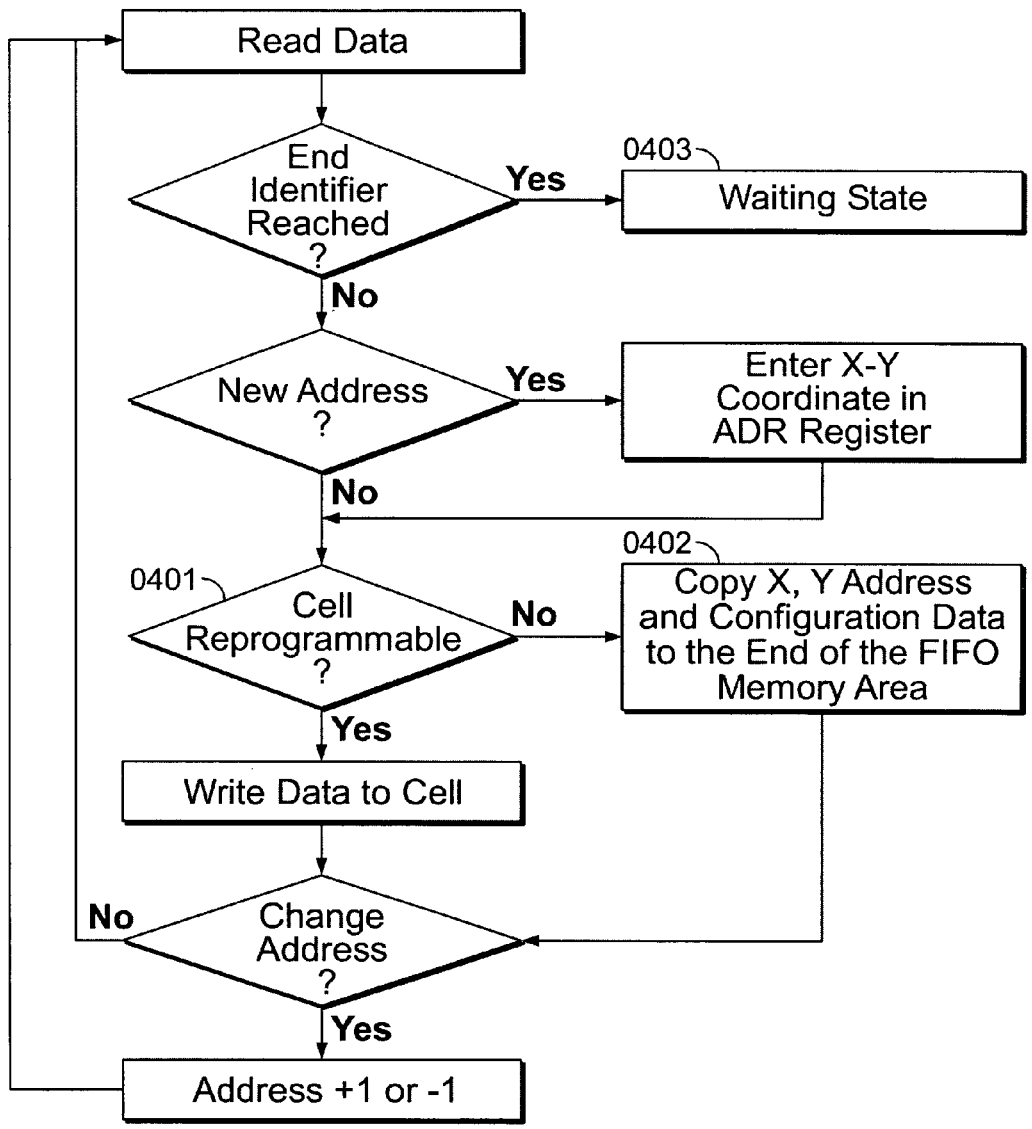
FIG. 4 shows a flow chart of the steps to be carried out in configuring the cells in accordance with the exemplary embodiment of the present invention.

Reloading cells: The PLU then reads the configuration data out of the configuration memory. This data contains the address of the cell to be reloaded (FIG. 4). Each cell can signal that it can be reloaded. The PLU tests this (0401). If the cell can be reloaded, the configuration data is transferred from the PLU to the cell.

If the cell is not yet ready, the data read by the PLU are written to a memory area, the FIFO memory, within the configuration memory (0402). The address to which the data is written is stored in a register (FIFO end REG) (0503) in the PLU.

This process is repeated until the PLU recognizes the END identifier of the configuration program and returns it to the state in which the PLU waits for events from the cells (0403).

Structure of the configuration program: After a cell has given the signal for reloading and the macro in which the cell is integrated has been reloaded, a new configuration is obtained. The cell which has previously given the signal to the PLU can now have a very different function, in particular it may no longer be the cell which sends a reload signal to the PLU. In the new configuration, it is possible for the same cell to again send the reload signal to the PLU.

By means of the DISPATCH command within the configuration program, a new address can be written to the entry position of the cell in the jump table (0604). This new address may point to a new configuration or subconfiguration to be loaded upon feedback from this cell.

Figure 1:
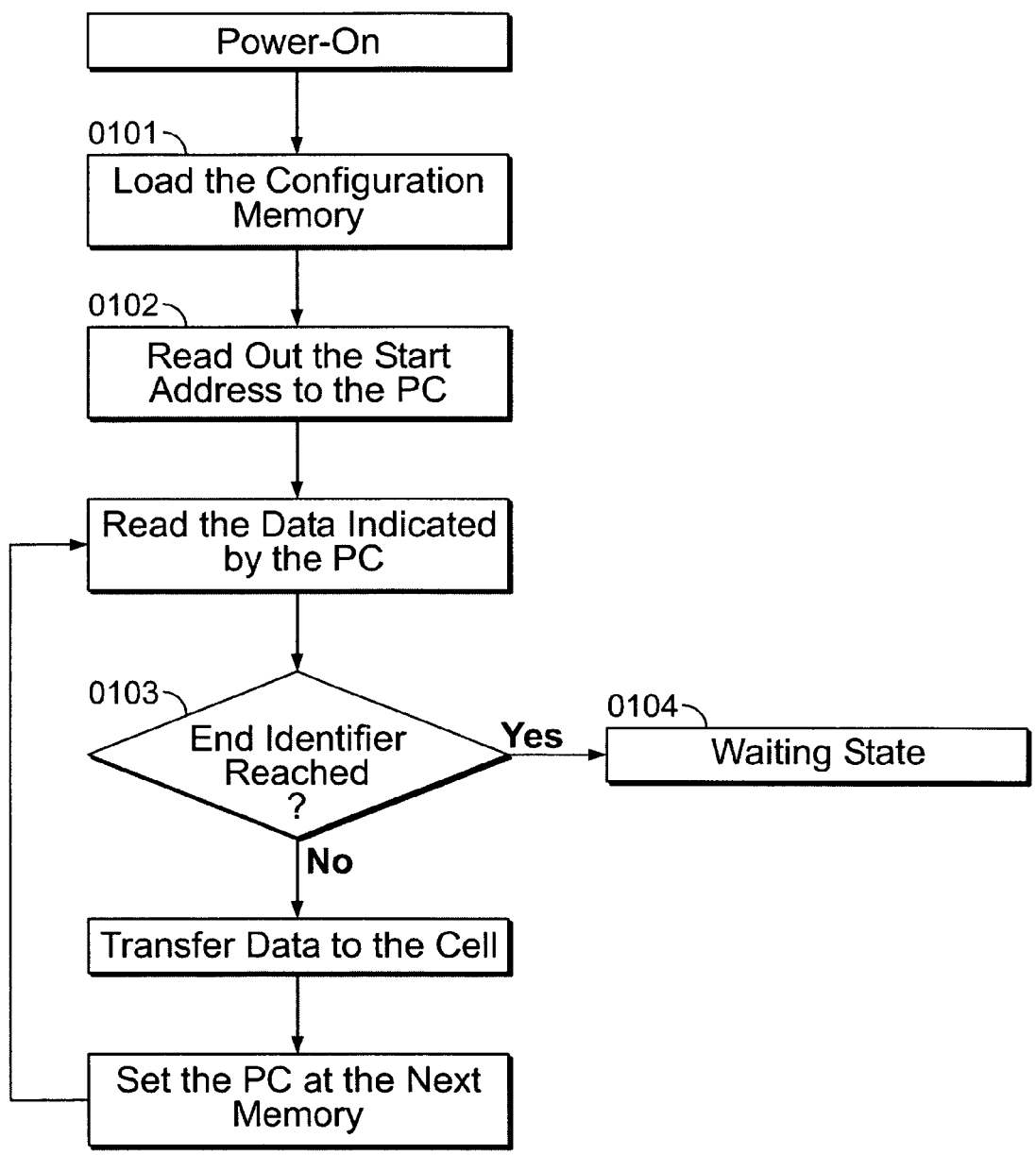
FIG. 1 shows a flow chart of the steps to be carried out after a system start in accordance with an exemplary embodiment of the present invention.

FIG. 1 shows a flow chart of the steps to be carried out after a system start. The system goes to the waiting state (0104) upon comparison of the start configuration with the END identifier.

FIG. 2 shows a flow chart of the required steps to be carried out during the waiting state and after a reconfiguration has been signaled by a cell. The flow chart has an entry point (0202) which is accessed from another location.

Figure 3:
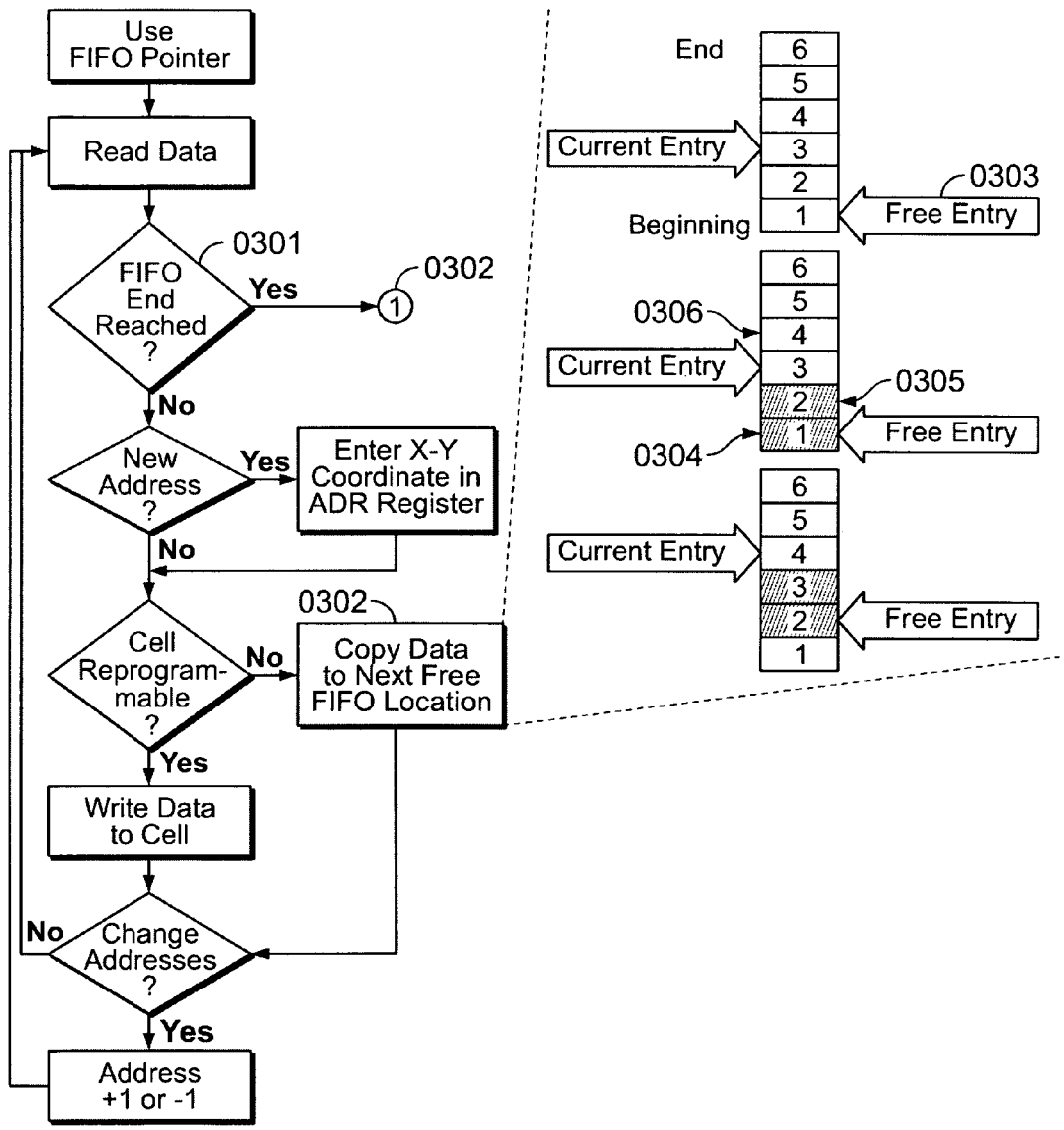
FIG. 3 shows a flow chart of the steps to be carried out in the FIFO memory processing in accordance with the exemplary embodiment of the present invention.

FIG. 3 shows a flow chart of how the FIFO memory is to be handled. It also shows how the copy process works within the FIFO memory.

FIG. 4 shows in a flow chart which steps are necessary in reconfigurating the cells and how a configuration is processed within the configuration program.

FIG. 5 shows the PLU and its registers. The PLU has five different registers, namely:

The start configuration REG (0501). This register contains the address of the start configuration within the configuration memory. The data is contained in the configuration program in such a way that it can be recognized by the PLU and transferred to the start configuration REG.

A FIFO start REG (0502). The FIFO start REG indicates the start of the FIFO memory area within the configuration memory.

A FIFO end REG (0503). The FIFO end REG denotes the end of the FIFO memory. The configuration strings which could not be processed by the PLU are copied to this location.

A FIFO free entry REG (0504). The FIFO free entry REG indicates the free entry closest to the beginning (FIFO start REG) of the FIFO memory. The configuration strings which again could not be processed by the PLU during the run-through of The FIFO memory are copied to this location.

A program counter (PC). The PC points to the address within the configuration memory where the next configuration string to be processed by the PLU is located.

An address REG (0510). The address of a cell to be addressed is stored in this register.

A data REG (0511). This register stores the configuration data to be sent to the cell addressed by address REG.

A dispatch REG (0512). Dispatch REG stores the address of the entry in the jump table accessed by the PLU.

In addition, the configuration memory and its various sections are also shown. These are:

The jump table (0506). For each cell that can be configured by the PLU there is a single entry. This entry contains the address which is loaded into the PC when signaled by this cell.

A start configuration (0507). The start configuration is any configuration loaded into the unit after starting the system.

Additional configurations (0508). These configurations can be loaded into the unit during system run time. The configurations consist of configuration strings and PLU commands.

A FIFO memory area (0509). The FIFO memory area contains all configuration strings that could not be processed successfully in a first attempt.

FIG. 6 shows two sections of a configuration. These sections show the commands and configuration strings processed by the PLU. It also shows two sections from the jump table (0601 and 0607) and the status of these sections (0602 and 0608) after processing of the two configuration sections.

Embodiments: It is assumed that one or more units are to be reconfigured by a PLU as described in the invention. In addition, it is assumed that the system has already loaded the start configuration and that the PLU is in the state of "waiting for an event." The execution begins with the arrival of an event from cell number 41.

The PLU begins first with the processing of The FIFO memory (0201). The start of the FIFO memory is transferred to the PC from the FIFO start REG register. The data at the location to which the PC is pointing is read. Then a check is performed to determine whether the end of the FIFO memory has been reached. This is the case in this embodiment, because the system is being reloaded for the first time.

The address of the cell which has triggered the signal is converted by the PLU to an address in the jump table. This calculated address is loaded into the dispatch REG (0512). The PLU then reads the address out of the jump table (0506) which is stored at the memory address addressed by the dispatch REG (0601). This address is loaded into the PC.

Then the processing of the configuration strings begins (0603). It is assumed that command number 3 (1.3 MUL) cannot be executed because the cell with the address (1.3) cannot be reconfigured. The data is then copied to the FIFO memory. On reaching the DISPATCH command (0604), a new address is entered (0602) at address 41 in the jump table. The END command again puts the PLU in the state of "waiting for an event."

After a period of time, a signal again arrives from cell 41. Now there is another address (0602) at address 42 in the jump table. The PLU again processes the FIFO memory first. Now the data is in the FIFO memory.

The data from the FIFO memory is read and an attempt is made to load the addressed cell with the data. Since the cell can now be reconfigured, this attempt is successful. A blank identifier is then written into the entry in the FIFO memory.

The original processing is continued and the reading of configuration data then begins at a different address (0605).

This configuration is processed; this time the DISPATCH command writes an address into entry number 12 of the jump table (0606). Then the END command causes the PLU to return to the state of "waiting for an event."

This interplay is repeated for the entire run time of the system.

Definition of Terms

Configurable element: A configurable element is a unit of a logic unit which can be set by a configuration string for a specific function. Configurable elements are thus all types of RAM cells, multiplexers, arithmetic logic units, registers and all types of internal and external interconnection description, etc.

Configuring: Setting the function and interconnection of a configurable element.

Configuration memory: The configuration memory contains one or more configuration strings.

Configuration string: A configuration string consists of a bit sequence of any length. This bit sequence represents a valid setting for the element to be configured, so that a functional element results.

PLU: Unit for configuring and reconfiguring programmable units. Embodied by a state machine or a microcontroller adapted specifically to its function.

Macro: A macro is a quantity of cells which together implement a task, function, etc.

Reconfiguring: New configuration of any number of configurable elements of a programmable unit while any remaining number of configurable elements continue their own functions (see configuring).

Feedback: Feedback is an action that can be triggered by a cell. With feedback, various pieces of information can be sent to the unit receiving the feedback.

Cell: See configurable element.

State machine: Logic unit which can assume various states. The transitions between states depend on various input parameters. These are known machines for controlling complex functions.

What is claimed is:

1. A system for reconfiguring a programmable unit, the programmable unit including a plurality of reconfigurable function cells in a multidimensional arrangement, comprising:

a primary logic unit in communication with at least one of the plurality of reconfigurable function cells, the primary logic unit configured to detect an event and to detect a state of the at least one of the plurality of reconfigurable function cells;

a first memory configured to store a first configuration data associated with a selected one of the plurality of reconfigurable function cells;

a jump table coupled to the primary logic unit having a plurality of entries, at least one of the plurality of entries configured to store a memory address of the first configuration data; and a first-in first out ("FIFO") memory shared by the plurality of reconfigurable function cells and coupled to the primary logic unit configured to store a plurality of configuration data associated with the plurality of reconfigurable function cells, the plurality of configuration data including the first configuration data;

wherein, when the primary logic unit detects the event, the primary logic unit reads the FIFO memory to determine whether a particular configuration data from the plurality of configuration data is stored in the FIFO memory.

2. The system according to claim 1, wherein, when the primary logic unit determines that no configuration data is stored in the FIFO memory, the primary logic unit retrieves the memory address, retrieves the first configuration data from the first memory based on the memory address, reconfigures the selected one of the plurality of reconfigurable function cells based on the configuration data if the selected one of the plurality of reconfigurable function cells is in a reconfigurable state, and stores the first reconfiguration data in the FIFO memory if the selected one of the plurality of reconfigurable function cells is not in a reconfigurable state.

3. The system according to claim 1, wherein, when the primary logic unit determines that some configuration data from the plurality of configuration data is stored in the FIFO memory, if the first configuration data is not stored in the FIFO memory, the primary logic unit retrieves the first configuration data from the first memory based on the memory address, and stores the first configuration data in the FIFO memory.

4. The system according to claim 1, wherein, when the primary logic unit determines that some configuration data from the plurality of configuration data is stored in the FIFO memory, if the first configuration data is stored in the FIFO memory and is not the first entered into the FIFO memory, the primary logic unit does not retrieve the first configuration data.

5. The system according to claim 1, wherein, when the primary logic unit determines that some configuration data from the plurality of configuration data is stored in the FIFO memory, if the first configuration data is the first entered into the FIFO memory, the primary logic unit retrieves the first configuration data from the FIFO memory.

6. A method for reconfiguring a programmable unit, the programmable unit including a plurality of reconfigurable function cells in a multidimensional arrangement, comprising:

detecting an event and a state of at least one of the plurality of reconfigurable function cells;

storing, in a first memory, a first configuration data associated with a selected one of the plurality of reconfigurable function cells;

storing a memory address of the first configuration data; and storing, in a first-in first-out ("FIFO") memory shared by the plurality of reconfigurable function cells, a plurality of configuration data associated with the plurality of reconfigurable function cells, that includes the first configuration data;

wherein, when detecting the event, the FIFO memory is read to determine whether a particular configuration data from the plurality of configuration data is stored in the FIFO memory.

7. The method according to claim 6, wherein, when determining that no configuration data is stored in the FIFO memory, the memory address is retrieved, the first configuration data is retrieved from the first memory based on the memory address, and, if the selected one of the plurality of reconfigurable function cells is not in a reconfigurable state, the first reconfiguration data is stored in the FIFO memory.

8. The method according to claim 6, wherein, when determining that some configuration data from the plurality of configuration data is stored in the FIFO memory, if the first configuration data is not stored in the FIFO memory, the first configuration data is retrieved from the first memory based on the memory address, and is stored in the FIFO memory.

9. The method according to claim 6, wherein, when the determining that some configuration data from the plurality of configuration data is stored in the FIFO memory, if the first configuration data is the first entered into the FIFO memory, the first configuration data is retrieved from the FIFO memory.

10. The method according to claim 6, wherein, when determining that some configuration data from the plurality of configuration data is stored in the FIFO memory, if the first configuration data is stored in the FIFO memory and is not the first entered into the FIFO memory, the first configuration data is not retrieved.

11. The method according to claim 6, wherein, when determining that no configuration data is stored in the FIFO memory, the memory address is retrieved, the first configuration data is retrieved from the first memory based on the memory address, and, if the selected one of the plurality of reconfigurable function cells is in a reconfigurable state, the selected one of the plurality of reconfigurable function cells is reconfigured based on the configuration data.

12. A system for run-time reconfiguration of a programmable unit, the programmable unit including a plurality of reconfigurable function cells in a multi-dimensional arrangement, comprising:

a primary logic unit in communication with at least one of the plurality of reconfigurable function cells, the primary logic unit configured to detect an event and to detect a state of the at least one of the plurality of reconfigurable function cells;

a first memory configured to store a first configuration data associated with a selected one of the plurality of reconfigurable function cells;

a jump table coupled to the primary logic unit having a plurality of entries, at least one of the plurality of entries configured to store a memory address of the first configuration data, wherein when the primary logic unit detects the event, the primary logic unit calculates the address of the at least one of the plurality of entries in the jump table based on a source of the event, retrieves the memory address, and retrieves the stored first configuration data based on the memory address; and a first-in first-out ("FIFO") memory shared by the plurality of reconfigurable function cells and coupled to the primary logic unit configured to store a plurality of configuration data associated with the plurality of reconfigurable function cells, the plurality of configuration data including the first configuration data, the first configuration data stored in the FIFO memory if the selected one of the plurality of reconfigurable function cells is not in a reconfiguration state, and the primary logic unit configured to reconfigure the selected one of the plurality of reconfigurable function cells if the selected one of the plurality of reconfigurable function cells is in a reconfigurable state;

wherein, when the primary logic unit detects the event, the primary logic unit reads the FIFO memory to determine whether a particular configuration data from the plurality of configuration data is stored in the FIFO memory.

13. The system according to claim 12, wherein the first memory is configured to store a plurality of configuration data, at least one configuration data from the plurality of configuration data including a complete configuration of the at least one of the plurality of reconfiguration function cells.

14. The system according to claim 12, wherein the first memory is configured to store at least one subconfiguration data configured to represent only a part of a complete configuration of the at least one of the plurality of reconfiguration function cells.

15. The system according to claim 12, wherein the primary logic unit contains a start configuration register which points to a start configuration that puts the at least one of the plurality of reconfiguration function cells in a valid state.

16. The system according to claim 12, wherein the primary logic unit contains a FIFO start register which points to a start of a memory area to which a configuration data is copied.

17. The system according to claim 12, wherein the primary logic unit contains a FIFO end register which points to an end of a memory area to which a configuration data is copied.

18. The system according to claim 12, wherein the primary logic unit contains a FIFO free entry register which points to a free entry of a memory area to which a configuration data is copied and which is closest to a start of the memory area.

19. The system according to claim 12, wherein the primary logic unit contains a program counter register which points to an entry to be processed within the first memory.

20. The system according to claim 12 wherein the primary logic unit contains an address register which points to an address of the cell which has triggered the event.

21. The system according to claim 12, wherein the primary logic unit contains a data register containing a configuration data which is transmitted to the at least one of the plurality of reconfiguration function cells in a reconfiguration.

22. The system according to claim 12, wherein the primary logic unit contains a dispatch register which contains the address of an entry in the jump table calculated from a cell address.

23. A system for reconfiguring a programmable unit, the programmable unit including a plurality of reconfigurable function cells in a multidimensional arrangement, comprising:

a primary logic unit for reconfiguring at least a selected one of the plurality of function cells and in communication with at least one of the plurality of reconfigurable function cells, the primary logic unit configured to detect an event when in communication with the at least one of the plurality of reconfigurable function cells;

a first memory configured to store a configuration data associated with at least the selected one of the plurality of function cells;

a first-in first-out ("FIFO") memory shared by the plurality of reconfigurable function cells; and a selection unit for selecting the configuration data from the first memory in response to the detection of the event, wherein the primary logic unit is configured to check a reconfigurability state of the selected one of the plurality of function cells, reconfigure the selected one of the plurality of function cells according to the selected configuration data upon a condition that the selected one of the plurality of function cells is in a reconfigurable state, and otherwise store the selected configuration data in the FIFO memory; and wherein, when the primary logic unit detects the event, the primary logic unit reads the FIFO memory to determine whether a particular configuration data from the plurality of configuration data is stored in the FIFO memory.

24. A method for deadlock-free run-time reconfiguration of a programmable unit, the programmable unit including a plurality of reconfigurable function cells in a multidimensional arrangement, comprising:

detecting an event;

selecting at least one of the plurality of reconfigurable function cells in response to the detected event;

reading entries of a first-in first-out ("FIFO") memory shared by the plurality of reconfigurable function cells and that stores configuration data associated with the plurality of reconfigurable function cells;

determining whether particular configuration data associated with the selected at least one function cell is stored in the FIFO memory;

in response to a determination that the configuration data associated with the selected at least one function cell is not stored in the FIFO memory and upon a condition that the determination is made, retrieving configuration data associated with the selected at least one function cell from another configuration memory; and if a state of the selected at least one function cell is not a reconfiguration state, storing the retrieved configuration data in the FIFO memory.

* * * * *